Figures 1, 3:
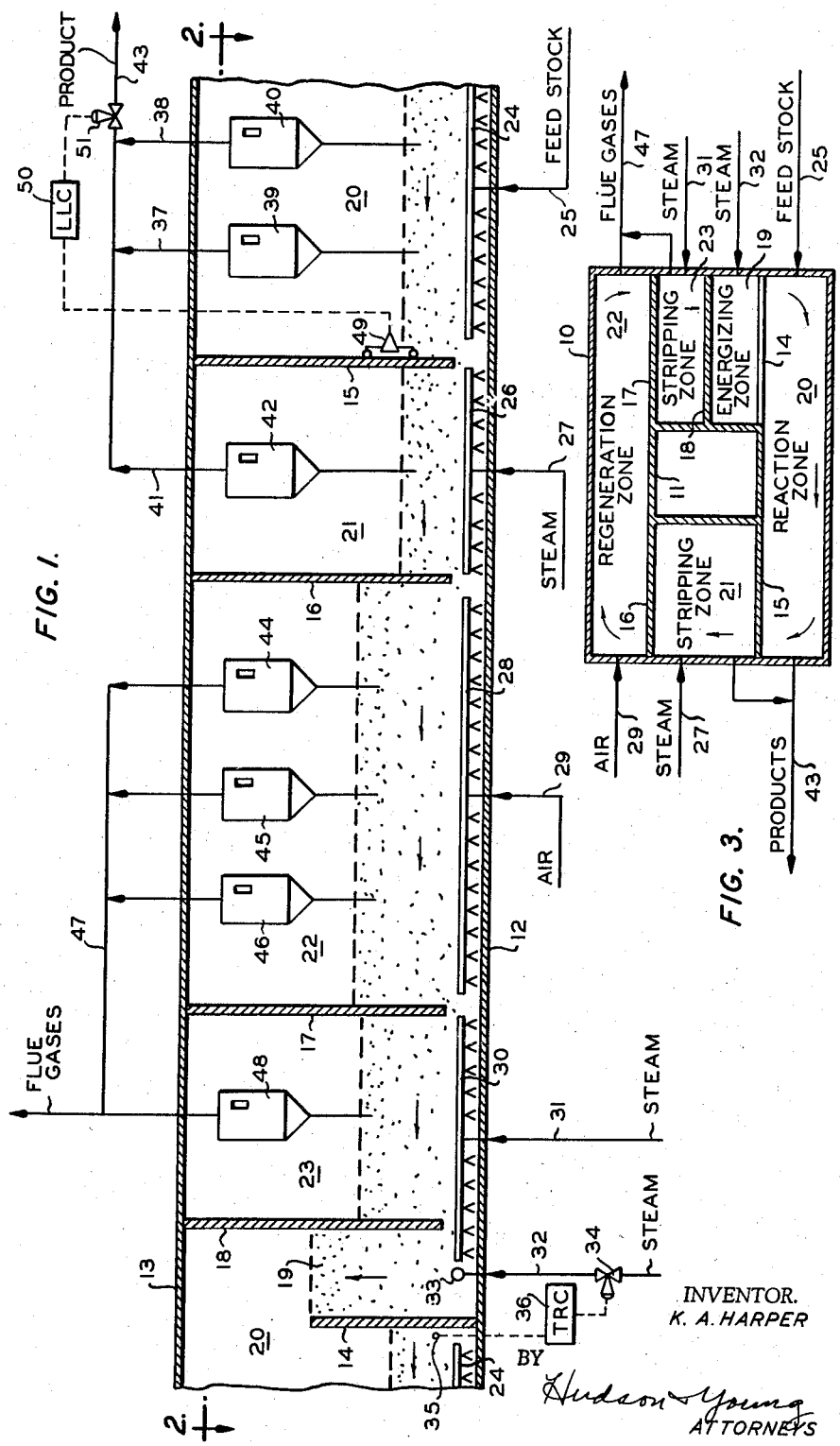

July 21, 1959 K. A. HARPER 2,895,906
FLUIDIZED SOLIDS PROCESS AND APPARATUS
Filed May 10, 1957 2 Sheets-Sheet 1

INVENTOR.
K. A. HARPER
BY Hudson & Young
ATTORNEYS

INVENTOR.
K. A. HARPER

United States Patent Office 2,895,906
Patented July 21, 1959

2,895,906

FLUIDIZED SOLIDS PROCESS AND APPARATUS

Kenneth A. Harper, Bartlesville, Okla., assignor to Phillips Petroleum Company, a corporation of Delaware Application May 10, 1957, Serial No. 658,398

14 Claims. (Cl. 208—147)

This invention relates to the contacting of a mass of fluidized solids with fluid streams. In one aspect, this invention relates to the catalytic conversion of reactants. In another aspect, this invention relates to an improved method and apparatus for conducting catalytic reactions in a fluidized solids conversion system. In one particular aspect, this invention relates to a method and apparatus for the circulation of fluidized solids in fluidized solids conversion systems.

The term "fluidized solids" is used throughout this specification and in the appended claims to define a dispersion of gas in solids effective in giving the mass of solids fluid characteristics. The mass of solid particles, when fluidized, forms a bed having a surface in which individual solid particles have a limited freedom of motion but are not substantially entrained in the fluidizing gas flowing through the bed. Thus, the bed of fluidized solid particles has the appearance of a boiling liquid. When solid particles having catalytic action are used, the conversion reactions are effected in this bed of fluidized catalyst and, thereafter, the catalyst particles are separated from gases or vapors in the reaction zone, stripped with an inert gas, such as steam, and transported to a regeneration zone. The regenerated catalyst is separated from the regeneration gases, transported to the reaction zone, and suspended in original gas or vapor for effecting further conversion.

In order to have a continuous process, an enormous bulk of catalyst must be continuously recycled in a fluidized solids system between the reaction zone and the regeneration zone. Numerous problems are encountered in handling these enormous quantities of finely-divided solid particles. For example, the abrasive action of these finely-divided particles prevent the use of ordinary mechanical pumps and conveyors for transporting these solid materials. Although pneumatic conveying means have been employed to transport these finely-divided solids, the quantity of finely-divided solids handled must be enormous in order that the flow of solids can be accurately controlled. The necessary pressure differentials to transport the fluidized catalyst are developed by the static head of the fluidized catalyst in standpipes and huge, cumbersome and expensive apparatus is necessary to handle the catalyst. As a result of the necessity of using large-size apparatus, thermal expansion of the separate parts of the apparatus due to the enormous differences in temperature incident to starting up or shutting down the system is a serious problem.

Another problem in fluidized conversion systems is the design and maintenance of valves for regulating the flow of finely-divided particles. These valves are difficult to fabricate and are expensive to manufacture. Because of the abrasive action of the finely-divided solids, they are troublesome to maintain.

An object of this invention is to provide a unitary fluidized solids conversion system. Another object of this invention is to provide an improved method and apparatus for controlling the cyclic flow of fluidized solids in a unitary fluidized solids conversion system. Another object of this invention is to provide a fluidized solids conversion system which is simple in construction and inexpensive to operate. Another object of this invention is to provide a method and apparatus for contacting a feed stream with a circulating mass of fluidized solids in a single chamber. Another object of this invention is to provide a fluidized solids conversion system which does not require the use of valves for controlling the flow of the fluidized solids in the system. Another object of this invention is to provide a method and apparatus for maintaining effective seals between the separate compartments in a fluidized solids conversion system. Another object of this invention is to provide an improved method and apparatus in a unitary fluidized solids conversion system for utilizing at least a portion of the heat of regeneration for supplying at least a portion of the heat of conversion. Another object of this invention is to provide a fluidized solids conversion system suitable for small refineries.

Other aspects, objects and advantages of the invention are apparent from a consideration of the accompanying disclosure, drawings and the appended claims.

In accordance with this invention, a charge to be converted is contacted with fluidized solids in a unitary system in which both the conversion and regeneration steps are conducted in a single chamber which is separated into the necessary zones by cooperating internal baffles. Fluidized solids flow in a cyclic manner through separate contacting zones arranged in sequence within the single chamber. These zones are formed by vertically partitioned baffles extending between the floor and ceiling of the unitary contacting chamber and comprises, in sequence, an energizing zone, a reaction zone, a stripping zone, a regeneration zone, and a second stripping zone. All baffles except the baffle disposed between the energizing zone and the reaction zone extend from the ceiling toward the floor of the chamber to a point adjacent the floor of the chamber so as to constitute an under-flow type baffle. If desired, the baffles can extend to the floor of the chamber so as to constitute walls, in which case, openings are provided at the base of each wall for the flow of fluidized solids therethrough. The baffle between the energizing zone and the reaction zone is of the over-flow type and extends from the floor of the chamber to a point intermediate between the floor and the ceiling of the chamber. Fluid inlets and outlets are provided in the reaction zone, first stripping zone, regeneration zone, and second stripping zone with suitable distribution means being provided adjacent the floor in each of these zones at each fluid inlet and suitable vapor-solids separation means being provided adjacent the ceiling in each of these zones at each fluid outlet. Although the contacting zones are arranged in a horizontal manner, the contacting zones can be arranged with the separate contacting zones disposed on different elevations.

As a particular feature of this invention, there is provided, in combination with the unitary contacting chamber, an improved method and apparatus for circulating the fluidized solids through the separate contacting zones and for control of said circulation.

The cyclic flow of the fluidized solids in sequence from the energizing zone through the reaction zone, the first stripping zone, the regeneration zone and the second stripping zone back to the energizing zone is effected by creating a pressure differential developed in the energizing zone, so that a decreasing pressure gradient is established through the reaction zone, first stripping zone, regeneration zone and second stripping zone, in sequence, with the pressure in either reaction zone or the reaction zone and the first stripping zone being regulated in accordance with the upper level of dense phase fluidized solids in the reaction zone. The pressure differential in the energizing zone is developed by the injection of steam under high pressure into the lower level of the energizing zone. The injection of steam into the energizing zone also serves to lift the fluidized solids entering the lower level of the energizing zone from the second stripping zone up over the vertical baffle between the energizing zone and the reaction zone. The steam injected into the energizing zone also serves to develop the fluidized condition of the finely-divided solid particles maintained throughout the separate zones in the system. The injection of the particular fluids in each of the separate zones in the system also aids in maintaining the fluidized state of these finely-divided particles. Although the driving force for transporting the fluidized solids through the various zones is created by developing a pressure differential in the system, the system is not under a substantial elevated pressure so that the highest pressure in the system is usually less than 15 p.s.i.g. Preferably, the highest pressure in any zone in the system is not greater than about 10 p.s.i.g. Usually, the lowest pressure in the system is maintained at about atmospheric pressure.

The unitary contacting chamber of this invention can be constructed in any shape so long as cyclic flow of the fluidized solids can be established within the chamber. For example, the unitary contacting chamber can be constructed in either circular, rectangular, or square shape. Ordinarily, the unitary contacting chamber is constructed with an inner and outer vertical wall so that the chamber is annular; however, a chamber of circular configuration can be constructed without an inner vertical wall. A unitary contacting chamber of either the rectangular or square configuration can also be constructed without an inner vertical wall so that there is a common wall between the reaction and regeneration zones which permits the heat developed in the exothermic regeneration zone to be utilized in the endothermic reaction zone. In this manner, a considerable heat economy is effected.

Although this invention is applicable to a wide variety of processes wherein the fluidized solids are contacted with a fluid, it will be described as applied to a process of catalytically cracking a gas oil. This invention is equally applicable to other hydrocarbon conversion processes conducted in the presence of a finely-divided catalyst, such as hydroforming, reforming, isomerization, hydrogenation, dehydrogenation, and polymerization processes. This invention is also applicable to other catalyst conversion processes, such as the manufacture of water gas and synthesis gas.

Figure 2:
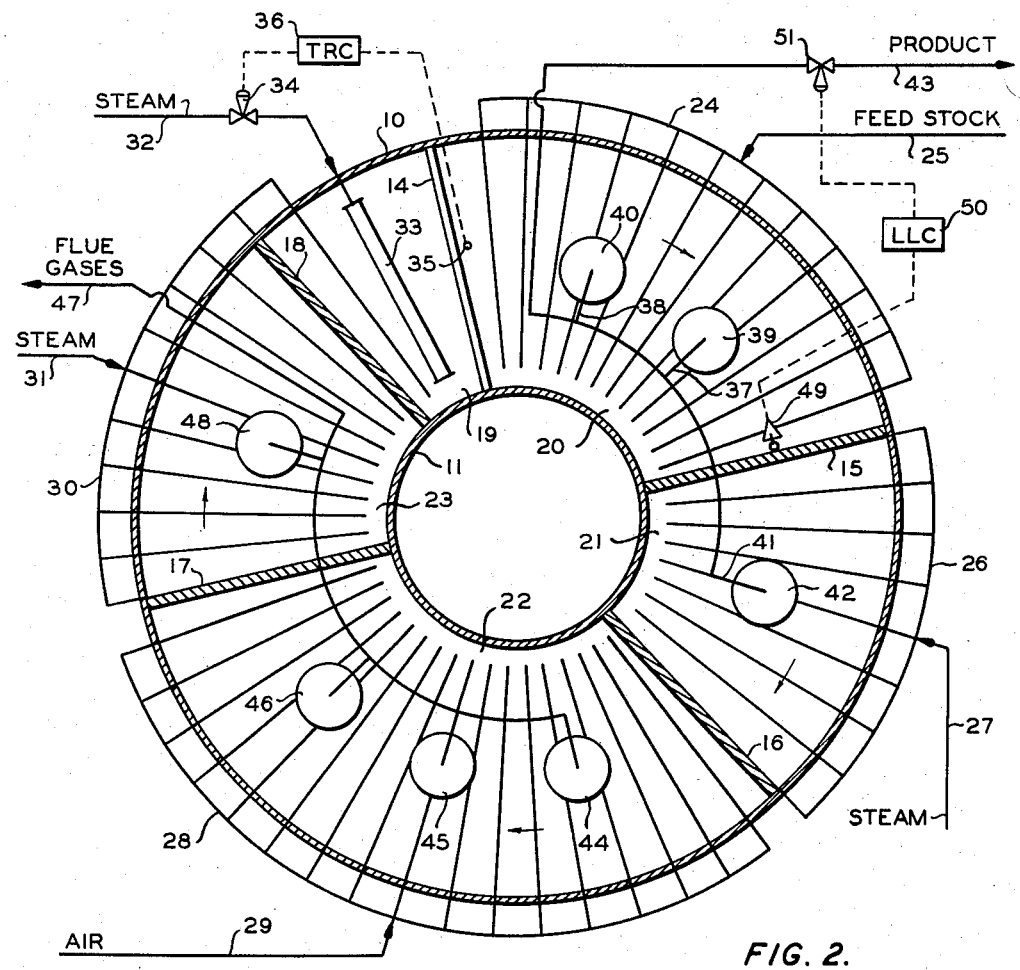
Figure 4:
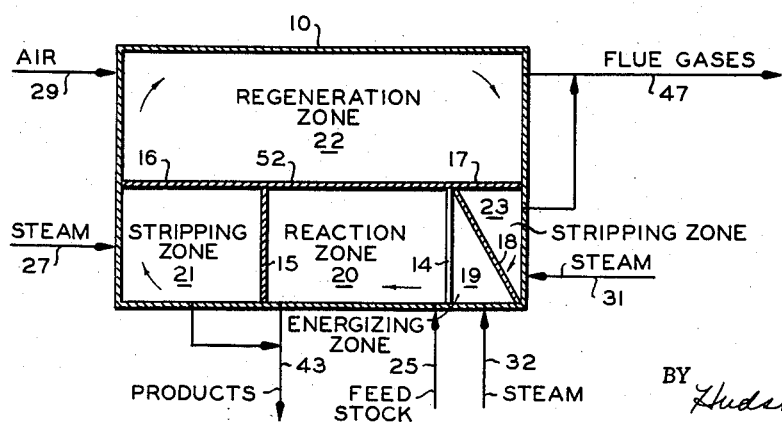

In the accompanying drawing, Figure 1 is a schematic vertical section of the circular unitary contacting chamber of Figure 2 taken along line 1—1 shown in an unfolded manner, Figure 2 is a schematic horizontal sectional view of the unitary contacting chamber of Figure 1 taken along line 2—2 showing the circular configuration of the chamber, Figure 3 is a schematic horizontal plan view of a unitary contacting chamber of square configuration, and Figure 4 is a schematic horizontal plan view of a unitary contacting chamber of rectangular configuration in which the regeneration and reaction zones have a common wall.

Referring to Figures 1 and 2, circular wall 10 forms the outer wall of the unitary contacting chamber and circular wall 11 forms the inner wall of said chamber. The chamber is closed at the bottom by floor 12 and at the top by ceiling 13. The interior of the chamber is divided into five zones by vertically positioned baffles 14, 15, 16, 17 and 18 extending between walls 10 and 11 of the chamber. Baffle 14 extends upwardly from floor 12 for a distance intermediate between floor 12 and ceiling 13 so as to form an over-flow type baffle. Baffles 15, 16, 17 and 18 extend down from ceiling 13 to a point adjacent to floor 12 so as to form an underflow type baffle. Baffles 14 and 18 are located a small distance apart so as to form energizing zone 19 between the surface walls of said baffles. Baffles 14 and 15 are located a substantial distance apart and form reaction zone 20. Baffles 15 and 16 are located a small distance apart and form first stripping zone 21. Baffles 16 and 17 are located a substantial distance apart, said distance being approximately the same as the distance between baffles 14 and 15, to form regeneration zone 22. Baffles 17 and 18 are located a short distance apart and form second stripping zone 23.

Fluid streams are introduced into each of zones 19, 20, 21, 22 and 23 through walls 10 and/or floor 12. Distributing header 24 adjacent floor 12 substantially covers the horizontal cross-sectional area of reaction zone 20 and provides uniform distribution of the hydrocarbon feed stock supplied to reaction zone 20 through line 25. Fluid distributor 26 adjacent floor 12 provides uniform distribution of steam entering through line 27 throughout the substantially horizontal cross-sectional area of first stripping zone 21. Distribution header 28 in regeneration zone 22 provides for uniform distribution of air entering through line 29 adjacent floor 12 throughout the substantially horizontal cross-sectional area of reaction zone 22. Distribution header 30 adjacent floor 12 in second stripping zone 23 provides for the uniform distribution of steam entering through line 31 throughout the substantially horizontal cross-sectional area of second stripping zone 23. Steam is introduced into energizing zone 19 through line 32 by means of distributor 33 located in the bottom section of energizing zone 19 adjacent floor 12. The flow of steam into energizing zone 19 is controlled by motor valve 34 in steam line 32 in accordance with the temperature in reaction zone 20 as determined by thermocouple 35 located in reaction zone 20. If desired, thermocouple 35 can be located in product withdrawal line 43 instead of in reaction zone 20. Temperature recorder controller 36 provides for the adjustment of the position of motor valve 34 in accordance with the temperature detected by thermocouple 35.

The reaction products produced in reaction zone 20 are discharged from the upper section of reaction zone 20 through lines 37 and 38. Cyclone separators 39 and 40 located adjacent ceiling 13 in reaction zone 20 provide for the separation of the reaction product from finely-divided catalyst and the return of the finely-divided catalyst so separated into the circulating bed of fluidized catalyst. In first stripping zone 21, the stripping steam and occluded reaction product stripped from the circulating fluidized catalyst is discharged through line 41 from first stripping zone 21. Cyclone separator 42 located adjacent ceiling 13 in first stripping zone 21 provides for separation of finely divided catalyst from the steam and occluded reaction products discharged through line 41. Lines 41, 37 and 38 all join in line 43 through which reaction product is passed to product separation (not shown). In regeneration zone 22, cyclone separators 44, 45, and 46 located adjacent ceiling 13 provide for separation of flue gases and fluidized catalyst with the return of the fluidized catalyst to the circulating bed and the discharge of the regeneration or flue gases from regeneration zone 22 by line 47. In a similar manner, the occluded flue gases and steam obtained in second stripping zone 23 are separated from fluidized catalyst in cyclone separator 48 and discharged from second stripping zone 23 through line 47.

The flow of reaction product from reaction zone 20 and steam and occluded reaction product from first stripping zone 21 through line 43 is controlled in accordance with the level of the dense phase of fluidized catalyst in reaction zone 20 as determined by liquid level detection means 49 located in reaction zone 20 adjacent baffle 15. Liquid level controller 50 provides for adjustment of motor valve 51 in line 43 in order to obtain this control. In effect, the control of the flow of reaction product from the reaction and first stripping zones is control of the pressure in the reaction and first stripping zones. In the operation of this control system, a decrease in the level of the dense phase of fluidized catalyst in reaction zone 20 is detected by liquid level detection means 49 and motor valve 51 in line 43 is opened by liquid level controller 50 to effect a reduction of the pressure in reaction zone 20.

Figure 3 shows the unitary contacting chamber of this invention in rectangular configuration; however, a square configuration may also be employed. The drawing in Figure 3 is greatly simplified and cyclone separators, fluid distribution means, control valves and the like are not shown. Except for the construction of the unitary contacting chamber in square configuration, the embodiment in Figure 3 is the same as the embodiment in Figures 1 and 2 and similar parts in each of these embodiments are designated by like reference characters.

In Figure 4, the unitary contacting chamber is shown in a rectangular configuration in greatly simplified form as noted for Figure 3. In this embodiment, the unitary contacting chamber has only an outer wall 10 and no inner wall. Common wall 25 is provided between reaction zone 20 and regeneration zone 22 to define these two zones. Thus, the exothermic heat developed in regeneration zone 22 is transferred through wall 52 into reaction zone 20 to supply at least a portion of the endothermic heat of reaction required there. In this embodiment, baffles 16 and 17 are arranged in the same plane as wall 52 and are located between the vertical edges of wall 52 and the inner surface of outer wall 10. Baffles 14 and 15 are located at the opposite vertical ends of wall 52 and are arranged at right angles with respect to wall 52 between wall 52 and outer wall 10. Baffle 18 is arranged between wall 52 and outer wall 10 at an oblique angle with respect to wall 52 at one vertical end of wall 52.

In the operation of the hereinabove-described system, steam is injected under pressure through line 32 into the bottom of energizing zone 19 to lift fluidized catalyst flowing under baffle 18 from second stripping zone 23 over baffle 14 separating energizing zone 19 from reaction zone 20. This steam also serves to fluidize the finely-divided catalyst particles. The catalyst is a conventional montmorillonite cracking catalyst having a particle size in the range of 40 to 400 Tyler mesh. A temperature of 900° F. is established in reaction zone 20 and the flow of steam into energizing zone 19 is regulated by motor valve 34 to regulate the quantity of catalyst cycled in order to maintain this temperature in reaction zone 20. Gas oil is introduced by line 25 into reaction zone 20 and distributed over the substantial horizontal cross-sectional area of reaction zone 20 by means of distributor 24 to contact the fluidized catalyst under reaction conditions. The reaction products are withdrawn from reaction zone 20 through solids-vapor separation means 39 and 40 by lines 37, 38 and 41 as product of the process. Due to the 2 p.s.i.g. elevated pressure existing in reaction zone 20, the fluidized catalyst flows under baffle 15 separating reaction zone 20 from first stripping zone 21 into first stripping zone 21 where any occluded reaction products are stripped from the fluidized catalyst by the injection of steam through line 27 into first stripping zone 21 and the distribution of said steam over the substantial horizontal surface of stripping zone 21 by distribution means 26. First stripping zone 21 serves not only to strip occluded reaction products from the fluidized catalyst but also serves to provide a seal between reaction zone 20 and regeneration zone 22 so as to prevent the flow of vapor between these two zones. The occluded vapor stripped from the fluidized catalyst and the stripping steam are withdrawn from stripping zone 21 through solids-vapor separation means 42 and recovered as reaction product through line 41. The level of the dense phase of the fluidized catalyst in reaction zone 20 is maintained substantially constant by regulation of the flow of reaction product from reaction zone 20 and first stripping zone 21. Thus, the pressure in first stripping zone 21 is substantially the same as the pressure in reaction zone 20.

The fluidized catalysts from which occluded product has been stripped flow under baffle 16 separating first stripping zone 21 from regeneration zone 22 into regeneration zone 22 where the catalytic activity of the fluidized catalyst is regenerated. Air or other regeneration gas is injected into regeneration zone 22 through line 29 over the substantial horizontal surface of regeneration zone 22 adjacent floor 12 by distribution means 28. The products of regeneration, such as flue gases, are withdrawn through vapor-solids separation means 44, 45 and 46 and line 47. The pressure in regeneration zone 22 is substantially atmospheric pressure so that the level of the dense phase of the fluidized catalyst is higher than the level of the fluidized catalyst in first stripping zone 21 and reaction zone 20. The air or regeneration gas injected into the bottom of regeneration zone 22 also aids in maintaining the fluidized state of the fluidized catalyst. The regenerated fluidized catalyst flows under baffle 17 between regeneration zone 22 and second stripping zone 23 because of the slightly lower pressure existing in second stripping zone 23. In second stripping zone 23, any occluded regeneration products are stripped from the fluidized catalyst by the injection of steam or other inert gas through line 31 over the substantial horizontal surface of second stripping zone 23 by distribution means 30. The occluded gas and steam are withdrawn through solids-vapor separating means 48 by means of line 47. The regenerated and stripped fluidized catalyst flows from second stripping zone 23, which is maintained at the lowest pressure in the system, under baffle 18 separating second stripping zone 23 from energizing zone 19 to begin a new cycle in the process.

Conventional reaction conditions can be employed in the apparatus of this invention in any of the processes to which it is adapted. As disclosed in the description of the drawing, catalytic cracking can be conducted in the apparatus of this invention in which case the reaction conditions comprise a temperature in the reaction zone in the range of between 800–1000° F., a temperature in the regeneration zone in the range of between 900–1100° F., catalyst to oil ratio in the range of from about 4:1– 15:1, catalyst residence time in the range of from about 10 seconds to about 10 minutes, weight space velocity in the range of from about 0.7 to about 20 pounds of oil per hour per pounds of catalyst, and a pressure in the reaction zone in the range of from about 2 p.s.i.g. to about 20 p.s.i.g. The conditions for carrying out various reactions are well known to those skilled in the art and will not require further description.

Preferably, this invention is employed in the catalytic cracking of a petroleum stream, such as a gas oil, residuum or distillate.

Although the unitary contact chamber of this invention can be employed to contact a liquid reactant with a fluidized solids material, preferably the reactant will be in a vaporized state or in mixed phase comprising both liquid and vapor phases. Ordinarily, the reactant is preheated at a sufficiently high temperature to convert it into vapor phase or at least at a sufficiently high temperature that a substantial portion of the reactant is converted into vapor phase upon contact with the hot fluidized solids in the system.

The pressure differential across the zones of the system is usually about 2 p.s.i. However, the total pressure is not limited except by optimum reaction conditions. It is desirable to operate the system at an optimum total pressure as low as a specific process will allow for economic reasons; that is, less expensive equipment and lower operating costs are usually realized at the lower total pressures.

Although in the figures I have shown numerous distributor pipes passing through the walls of the unit, it is to be understood that one pipe in each zone may pass through the wall, and then the distributor pipes are connected thereto within the vessel in order to minimize the number of pipe-to-vessel seals required.

*Specific example*

Reactor zone 20:
    Temperature, ° F _____ 900
    Pressure, p.s.i.g _____ 2.0
    Cat./oil wt. ratio _____ 6:1
First stripping zone 21:
    Temperature, ° F _____ 898
    Pressure, p.s.i.g _____ 1.9
Regeneration zone 22:
    Temperature, ° F _____ 1100
    Pressure, p.s.i.g _____ 0
Second stripping zone 23:
    Temperature, ° F _____ 1098
    Pressure, p.s.i.g _____ 0
Energizing zone 19:
    Temperature, ° F _____ 1096
    Pressure, p.s.i.g _____ 2.0

The charge material 25 is a virgin gas oil produced by the distillation of Western Kansas crude oil. The charge oil measures 29.0 API at 60° F./60° F. The catalyst employed is a synthetic silica-alumina cracking catalyst having a mesh size of from 40 to 400 Tyler mesh. The present conversion is 65. Coke laydown on the used catalyst passing to the regeneration zone is 1.3 weight percent. Coke content of the regenerated catalyst is 0.35 weight percent.

Reasonable variation and modification are possible within the scope of the foregoing disclosure, drawings and the appended claims to the invention, the essence of which is that there have been provided a method and apparatus for conducting reactions in a unitary fluidized solids system wherein the reaction zone and the regeneration zone are in a single vessel and circulation of the fluidized solids is secured by a pressure differential developed in an energizing zone with the pressure in the reaction zone being controlled in accordance with the level of the dense phase of fluidized solids in the reaction zone.

I claim:

1. Apparatus for contacting fluidized solid particles with fluids comprising an enclosed chamber containing a quantity of finely-divided solid particles, means for separating said chamber into five zones, means for introducing fluids into said chamber into each of said zones adjacent the bottom of each of said zones, vapor-solids separation means in four of said zones adjacent the top of said chamber, means for withdrawing fluid from said chamber from each of said four zones through said vapor-solids separation means, means for fluidizing said finely-divided particles, means for developing a pressure gradient between said 5 zones for circulating said fluidized finely-divided particles in a cyclic manner through each of said zones, and means for controlling the pressure in one of said zones in accordance with the upper level of the dense phase of said fluidized finely-divided particles in that zone.

2. Apparatus for contacting fluidized solid particles with fluids comprising an enclosed chamber containing a quantity of finely-divided solid particles, vertical baffle means for separating said chamber into five zones in communication with each other in a cyclic manner, said communication between two zones being located at a point between the midpoint of the distance between the top and bottom of said chamber and the top of said chamber and the said communication between all other zones being adjacent the bottom of said chamber, means for introducing fluids into said chamber into four of said zones adjacent the bottom of each of said zones, distribution means for distributing said fluids introduced into each of four of said zones over the substantial horizontal cross-sectional area of each of said four zones, vapor-solids separation means located at the top of said chamber in each of said four zones in which the said fluids are introduced over the substantial horizontal cross-sectional area thereof, means for withdrawing fluid from said chamber from each of said four zones through said vapor-solids separation means, means for developing a pressure gradient between said five zones and for fluidizing said finely-divided particles by introduction of fluid into the bottom of the fifth zone, said pressure gradient between said five zones causing circulation of said fluidized solids through said five zones in a cyclic manner, and means for controlling the pressure in one of said four zones in accordance with the level of the dense phase of said fluidized finely-divided particles in that zone.

3. Apparatus for contacting fluidized catalyst with a fluid reactant comprising an enclosed chamber containing a quantity of finely-divided catalyst particles; a first baffle extending from the bottom of said chamber toward the top thereof; a second baffle extending from the top of said chamber toward the bottom thereof at a spaced distance from said first baffle and forming a reaction zone between said first and second baffles; a third baffle extending from the top of said chamber toward the bottom thereof at a spaced distance from said second baffle and forming a first stripping zone between said second and third baffles; a fourth baffle extending from the top of said chamber toward the bottom thereof at a spaced distance from said third baffle and forming a regeneration zone between said third and fourth baffles; a fifth baffle extending from the top of said chamber toward the bottom thereof at a spaced distance from said fourth baffle and forming a second stripping zone between said fourth and fifth baffles, said fifth baffle also forming an energizing zone between said fifth and said first baffles; means for introducing a fluid under pressure at the bottom of said energizing zone so as to fluidize said finely-divided catalyst, to develop a pressure gradient between each of said energizing, reaction, first stripping, regeneration, and second stripping zones, and to lift fluidized catalyst flowing under said fifth baffle from said second stripping zone through said energizing zone and over said first baffle into said reaction zone; means for introducing a fluid reactant into the bottom of said reaction zone over the substantial horizontal cross-sectional area of said reaction zone; vapor-solids separation means in the top of said reaction zone; means for withdrawing reaction product from said reaction zone through said vapor-solids separation means; means for controlling the pressure in said reaction means in accordance with the level of the dense phase of the fluidized catalyst in said reaction zone; means for introducing a stripping gas into the bottom of said first stripping zone over the substantial horizontal cross-sectional area of said first stripping zone for stripping occluded reaction product from the fluidized catalyst flowing under said second baffle from said reaction zone into said first stripping zone; vapor-solids separation means in the top of said first stripping zone; means for withdrawing the stripped products from said first stripping zone through said vapor-solids separation means disposed in said first stripping zone; means for introducing a regeneration gas into the bottom of said regeneration zone over the substantial horizontal cross-sectional area of said regeneration zone for regeneration of the fluidized catalyst flowing under said third baffle from said first stripping zone into said regeneration zone; vapor-solids separation means in the top of said regeneration zone; means for withdrawing regeneration products from said regeneration zone through said vapor-solids separation means disposed in said regeneration zone; means for introducing a stripping gas into the bottom of said second stripping zone over the substantial horizontal cross-sectional area of said second stripping zone for stripping occluded regeneration products from the fluidized catalyst flowing under said fourth baffle from said regeneration zone into said second stripping zone; vapor-solids separation means in the top of said second stripping zone; and means for withdrawing stripped regeneration products from said second stripping zone through said vapor-solids separation means disposed in said second stripping zone.

4. The apparatus of claim 3 wherein said enclosed chamber is circular in cross-section.

5. The apparatus of claim 3 wherein said enclosed chamber is square in cross-section.

6. The apparatus of claim 3 wherein said enclosed chamber is circular in horizontal cross-section, wherein said enclosed chamber has an inner and an outer wall forming an annular body, and wherein said first baffle, said second baffle, said third baffle, said fourth baffle, and said fifth baffle are radially disposed.

7. The apparatus of claim 3 wherein said enclosed chamber is rectangular in cross-section.

8. The apparatus of claim 7 wherein said reaction zone and said regeneration zone have a common wall extending from the top of said chamber to the bottom of said chamber and disposed between said regeneration zone and said reaction zone.

9. A process for contacting fluidized solid particles with fluids in a unitary contact chamber having an energizing zone, a reaction zone, a first stripping zone, a regeneration zone, and a second stripping zone, said process comprising maintaining a bed of fluidized solids in each of said zones; introducing steam into the bottom of said energizing zone to develop a pressure gradient through each of said zones in order to effect circulation of said bed of fluidized solids through each of said zones in a cyclic manner; introducing fluids into the bottom of said reaction zone, first stripping zone, regeneration zone, and second stripping zone; contacting said fluidized solids with said introduced fluids in said reaction zone, first stripping zone, regeneration zone, and second stripping zone; and withdrawing vapors from the top of said regeneration zone, first stripping zone, reaction zone, regeneration zone, and second stripping zone.

10. A process for contacting fluidized solid particles with fluids in a unitary contact chamber having an energizing zone, a reaction zone, a first stripping zone, a regeneration zone, and a second stripping zone, said process comprising maintaining a bed of fluidized solids in each of said zones; introducing steam into the bottom of said energizing zone to develop a pressure gradient through each of said zones in order to cause circulation of said bed of fluidized solids through each of said zones in a cyclic manner; introducing fluids into the bottom of said reaction zone, first stripping zone, regeneration zone, and second stripping zone; contacting said fluidized solids with said introduced fluids in said reaction zone, first stripping zone, regeneration zone, and second stripping zone; withdrawing vapors from the top of said reaction zone, first stripping zone, regeneration zone, and second stripping zone; and controlling the pressure in said reaction zone in accordance with the level of the dense phase of said fluidized bed in said reaction zone.

11. A process for contacting fluidized catalyst with fluids in a unitary contacting chamber having an energizing zone, a reaction zone, a first stripping zone, a regeneration zone, and a second stripping zone, said process comprising maintaining a bed of fluidized catalyst in each of said zones, introducing steam into the bottom of said energizing zone to develop a pressure gradient through each of said zones in order to cause circulation of said bed of fluidized catalyst through each of said zones in a cyclic manner, introducing a feed stream into the bottom of said reaction zone, contacting said fluidized catalyst with said introduced feed stream in said reaction zone, withdrawing reaction product from the top of said reaction zone through a vapor-solids separation means, controlling the pressure in said reaction zone in accordance with the level of the dense phase of said fluidized catalyst in said reaction zone, flowing said fluidized catalyst from said reaction zone into said first stripping zone, introducing an inert stripping gas into the bottom of said first stripping zone, contacting said fluidized catalyst with said inert stripping gas in said first stripping zone, withdrawing stripped products from the top of said first stripping zone through vapor-solids separation means, flowing the stripped fluidized catalyst from said first stripping zone into said regeneration zone, introducing regeneration gas into the bottom of said regeneration zone, contacting said fluidized catalyst with said introduced regeneration gas in said regeneration zone, withdrawing flue gas from the top of said regeneration zone through vapor-solids separation means, flowing the regenerated fluidized catalyst from said regeneration zone into said second stripping zone, introducing a stripping gas into the bottom of said second stripping zone, contacting said fluidized catalyst with said introduced stripping gas in said second stripping zone, withdrawing stripped products from the top of said second stripping zone through vapor-solids separation means, and flowing said stripped fluidized catalyst from said second stripping zone into said energizing zone to begin a new cycle of the process.

12. The process of claim 11 wherein said feed stream is a gas oil in vapor phase, said inert stripping gas in said first and said second stripping zones is steam, and said regeneration gas is air.

13. A process for contacting fluidized cracking catalyst with fluids in a unitary contacting chamber having an energizing zone, a reaction zone, a first stripping zone, a regeneration zone, and a second stripping zone, said process comprising maintaining a bed of fluidized cracking catalyst in each of said zones; introducing steam into the bottom of said energizing zone to develop a pressure gradient through each of said zones in order to effect circulation of said bed of fluidized cracking catalyst through each of said zones in a cyclic manner; introducing a gas oil fraction into the bottom of said reaction zone; contacting said fluidized cracking catalyst with said introduced gas oil fraction in said reaction zone; maintaining in said reaction zone a pressure in the range of 2-20 p.s.i.g., a temperature in the range of 800–1000° F., and a catalyst residence time in the range of 10 seconds to 10 minutes; withdrawing reaction product from the top of said reaction zone through a vapor-solids separation means; controlling the pressure in said reaction zone in accordance with the level of the dense phase of said fluidized cracking catalyst in said reaction zone; flowing said fluidized cracking catalyst from said reaction zone into said first stripping zone; introducing steam into the bottom of said first stripping zone; contacting said fluidized cracking catalyst with said steam in said first stripping zone; withdrawing stripped products from the top of said first stripping zone through vapor-solids separation means; flowing the stripped fluidized catalyst from said first stripping zone into said regeneration zone; introducing air into the bottom of said regeneration zone; contacting said fluidized cracking catalyst with said introduced air in said regeneration zone; maintaining in said regeneration zone a temperature in the range of 900–1100° F. and a pressure of approximately atmospheric; withdrawing flue gas from the top of said regeneration zone through vapor-solids separation means; flowing the regenerated fluidized catalyst from said regeneration zone into said stripping zone; introducing steam into the bottom of said second stripping zone; contacting said fluidized cracking catalyst with said introduced steam in said second stripping zone; withdrawing stripped products from the top of said second stripping zone through vapor-solids separation means; and flowing said stripped fluidized catalyst from said second stripping zone into said energizing zone to begin a new process cycle.

14. A process for contacting fluidized cracking catalyst with fluids in a unitary contacting chamber having an energizing zone, a reaction zone, a first stripping zone, a regeneration zone, and a second stripping zone, said process comprising maintaining a bed of fluidized cracking catalyst in each of said zones; introducing steam into the bottom of said energizing zone to develop a pressure gradient through each of said zones in order to effect circulation of said bed of fluidized cracking catalyst through each of said zones in a cyclic manner; introducing a gas oil fraction into the bottom of said reaction zone; contacting said fluidized cracking catalyst with said introduced gas oil fraction in said reaction zone; maintaining in said reaction zone an elevated pressure and hydrocarbon conversion reaction conditions; withdrawing reaction product from the top of said reaction zone through a vapor-solids separation means; controlling the pressure in said reaction zone in accordance with the level of the dense phase of said fluidized cracking catalyst in said reaction zone; flowing said fluidized cracking catalyst from said reaction zone into said first stripping zone; introducing steam into the bottom of said first stripping zone; contacting said fluidized cracking catalyst with said steam in said first stripping zone; withdrawing stripped products from the top of said first stripping zone through vapor-solids separation means; flowing the stripped fluidized catalyst from said first stripping zone into said regeneration zone; introducing air into the bottom of said regeneration zone; contacting said fluidized cracking catalyst with said introduced air in said regeneration zone; maintaining in said regeneration zone a pressure of approximately atmospheric pressure and regeneration conditions; withdrawing flue gas from the top of said regeneration zone through vapor-solids separation means; flowing the regenerated fluidized catalyst from said regeneration zone into said stripping zone; introducing steam into the bottom of said second stripping zone; contacting said fluidized cracking catalyst with said introduced steam in said second stripping zone; withdrawing stripped products from the top of said second stripping zone through vapor-solids separation means; and flowing said stripped fluidized catalyst from said second stripping zone into said energizing zone to begin a new process cycle.

References Cited in the file of this patent
UNITED STATES PATENTS

| | | |
|---|---|---|
| 2,464,812 | Johnson | Mar. 22, 1949 |
| 2,468,508 | Munday | Apr. 26, 1949 |
| 2,521,195 | Wheeler | Sept. 5, 1950 |
| 2,560,356 | Liedholm | July 10, 1951 |